United States Patent [19]

Wixom

[11] 4,364,221

[45] Dec. 21, 1982

[54] LAWN MOWER

[76] Inventor: Marvin J. Wixom, 1505 W. Pierce St, Phoenix, Ariz. 85007

[21] Appl. No.: 279,826

[22] Filed: Jul. 2, 1981

[51] Int. Cl.³ ........................................... A01D 35/264
[52] U.S. Cl. ...................................... 56/13.6; 56/255; 56/320.2
[58] Field of Search ...................... 56/13.6, 17.5, 295, 56/320.1, 320.2, 255

[56] References Cited

U.S. PATENT DOCUMENTS

| | | | |
|---|---|---|---|
| 2,726,503 | 12/1955 | Phelps | 56/320.2 |
| 2,957,295 | 10/1960 | Brown | 56/295 |
| 3,396,518 | 8/1968 | Johnson | 56/17.5 |
| 3,667,199 | 6/1972 | Bloom | 56/320.2 |
| 4,055,036 | 10/1977 | Kidd | 56/13.6 |
| 4,099,366 | 7/1978 | Peterson | 56/13.6 |

*Primary Examiner*—Jay N. Eskovitz
*Attorney, Agent, or Firm*—Harry M. Weiss

[57] ABSTRACT

An improved type of lawn mower that incorporates two cutting blades rotatably mounted in separate housings diagonally opposed to each other at the bottom portion of the lawn mower housing. The diagonal mounting of the cutting blades permits cutting overlap and an increased cutting path. A cleaning blade assembly is mounted on each of the cutting blades to aid in the efficient removal of grass clippings from the walls of each of the blade housings, through individual exit chutes preferably located on the same side of the mower housing or deck so that large areas of long or damp grass can be cut with a significant savings in time and labor.

3 Claims, 5 Drawing Figures

LAWN MOWER

BACKGROUND OF THE INVENTION

1. Field of the Invention

This invention relates generally to an improved type of lawn mower, and more specifically, to lawn mowers of the type having multiple blades for the purpose of rapidly cutting areas of grass and having self-contained mechanical devices to prevent the accumulation of long or damp grass clippings within the cutting blade housings.

2. Description of the Prior Art

In the past, most gasoline or electrically driven lawn mowers were built incorporating the use of one cutting blade rotatably mounted in a single housing. These mowers were manually pushed or controlled to cut a relatively narrow path in a grass area thereby requiring many passes to complete a cutting job.

These prior art type mowers exhibited the tendency to accumulate clippings within the cutting blade housing when cutting long or slightly damp grass. This often required the manual removal of the accumulation of grass clippings to avoid restricting the rotation of the cutting blade or to permit ejection of the clippings through the outlet of the housing portion located around the cutting blade to prevent the choking off or stopping of the blade rotation. Thus, a great deal of time was wasted in stopping the mower to remove the clippings and then restarting the mower after clipping removal. Additionally, it was very difficult to perform mowing jobs in the early morning hours when the grass was usually somewhat damp thereby reducing the daylight time available for cutting grass.

One improvement in this type of prior art mower was introduced incorporating the use of a tractor driven lawn mower comprised of a larger cutting blade. While a wider path was cut by the larger cutting blade, the problem of grass clippings accumulating within the cutting blade housing and restricting the cutting blade rotation was not alleviated, due to the increased volume of grass clippings caused by the cutting of the wider path. Furthermore, for many relatively small area grass cutting jobs, the use of a tractor driven mower was impractical.

The need existed for a relatively small lawn mower that could be manually controlled or operated and that would not only cut a relatively wide path through long or damp grass, but would also facilitate the continuous removal of the grass clippings from within the cutting blade housing. The result would be to significantly reduce labor because of decreased cutting time and to further reduce the inherently dangerous task of manually freeing a restricted rotating cutting blade.

SUMMARY OF THE INVENTION

In accordance with one embodiment of this invention, it is an object of this invention to provide an improved type of lawn mower that will cut a relatively wide path through either dry or damp grass.

It is another object of this invention to provide an improved lawn mower that incorporates multiple cutting blades to cut separate yet overlapping paths through dry or damp grass.

It is a further object of this invention to provide an improved lawn mower that will simultaneously cut grass and efficiently and mechanically remove grass clippings from within the cutting blade housing for either single or multiple cutting blade assemblies.

It is still another object of this invention to provide an improved two blade lawn mower that incorporates two completely separate and isolated housings for the two blade assemblies, including separate "exit chutes", to accommodate the removal of grass clippings from within the two blade assemblies or housings.

DESCRIPTION OF THE PREFERRED EMBODIMENT

In accordance with one embodiment of this invention, an improved type of lawn mower is disclosed which is comprised of a housing, at least two blade housings mounted substantially diagonally opposed to each other on said housing, and a cutting blade rotatably mounted in each of the said blade housings. The said cutting blades are each contained in individual and isolated blade housings, each cutting a separate yet (together) integrally overlapping path through the grass. This invention incorporates the use of a securely mounted cleaning blade upon each of the cutting blades. The cleaning blades will be of shape so as to conform to but not contact the blade housings. The cleaning blade then rotates with the cutting blade and, while not interfering with the cutting procedure, aids in the exit, through individual exit chutes located on the same side of the mower housing or deck, of any grass accumulation.

The foregoing and other objects, features, and advantages of the invention will be apparent from the following, more particular description of the preferred embodiments of the invention as illustrated in the accompanying drawings.

THE SPECIFICATION

Figure 1:
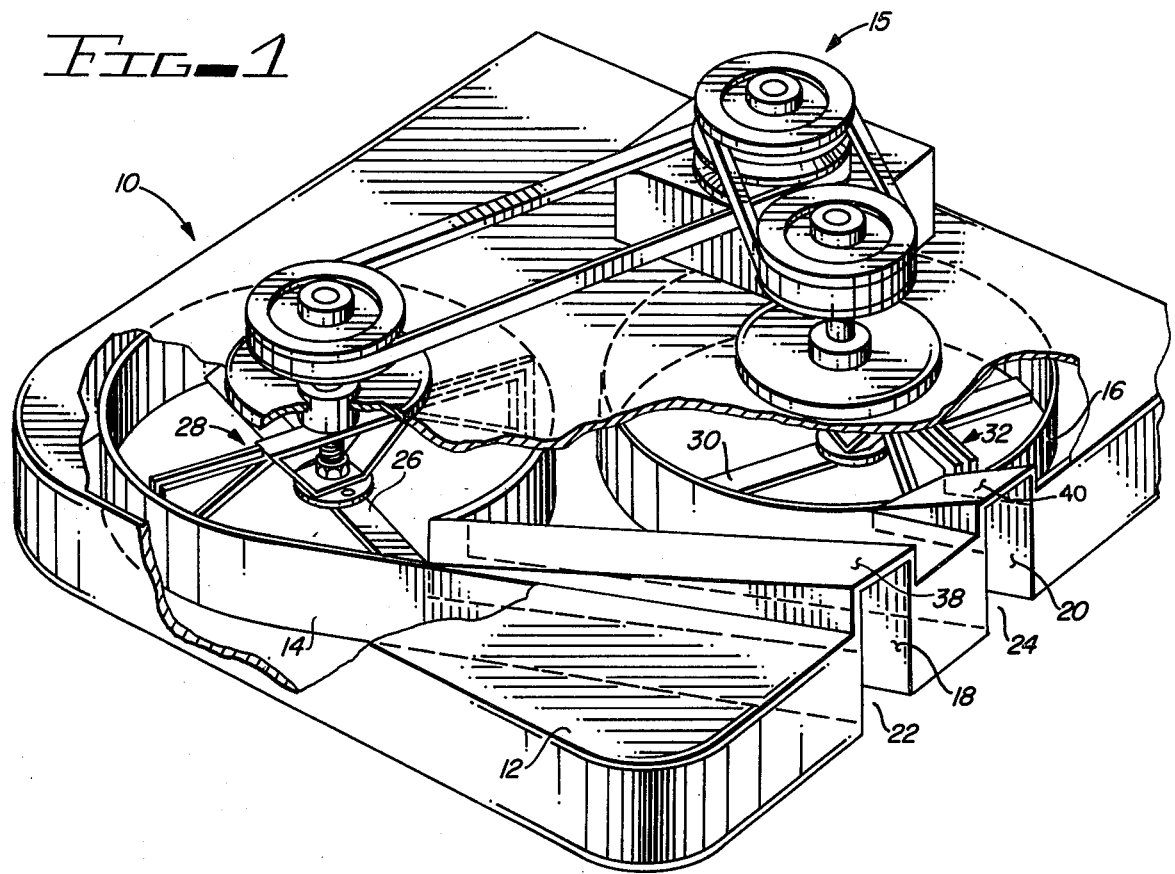
FIG. 1 is a perspective view with parts broken away to show the interior portion of the improved lawn mower housing of this invention (without the wheels and handle) which comprises a pulley assembly, individual blade housings and associated exit chutes, and two sets of cutting and cleaner blades.

Referring to FIG. 1, the improved lawn mower housing is generally referenced by the number 10. The lawn mower housing 10 is comprised of one large mower deck 12 underneath which is welded (or suitably fastened or mounted) two separate blade housings 14 and 16. Mounted rotatably within each of the blade housings 14 (and 16), and preferably driven by pulley assembly 15, is a cutting blade 26 (and 30), and a cleaner blade assembly 28 (and 32). Leading preferably from one side of the mower deck 12 to each of the blade housings 14 and 16, are exit chute housings 18 and 20. The exit chute housings 18 and 20 accommodate the removal of grass clippings through the respective exit chutes 22 and 24 and hold in place respective exit chute covers 38 and 40 which may be removable, if desired.

Figure 2:
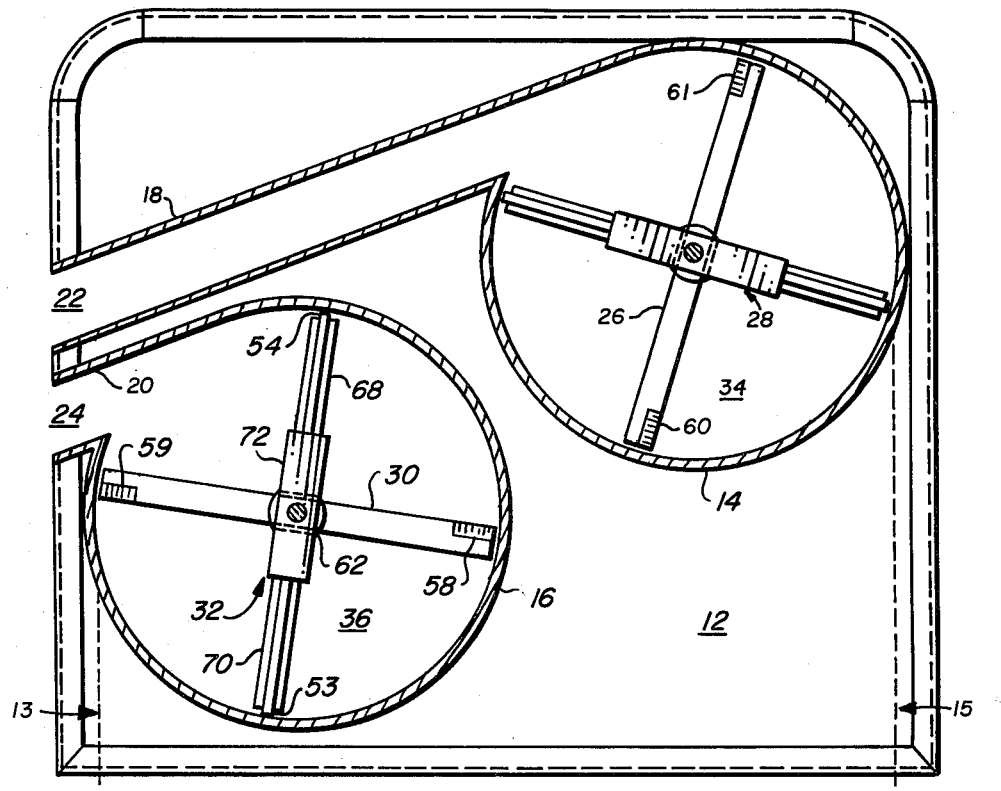
FIG. 2 is a bottom view of the improved lawn mower housing of FIG. 1.

Referring to FIG. 2, the leading cutting edges 58, 59,60, and 61 of the respective rotating cutting blades 26 and 30 cut circular path areas 34 and 36 within the blade housings 14 and 16. The cutting path areas 34 and 36 overlap by a small amount to form one enlarged integral cutting path as shown by the dashed lines 13 and 15. The combined rotating action of the cutting blades 26 and 30, and the respective cleaning blade assemblies 28 and 32 force the grass clippings of various lengths and dampness from within the blade housings 14 and 16 through the exit paths 22 and 24 formed by the exit chute housings 18 and 20.

Figure 3:
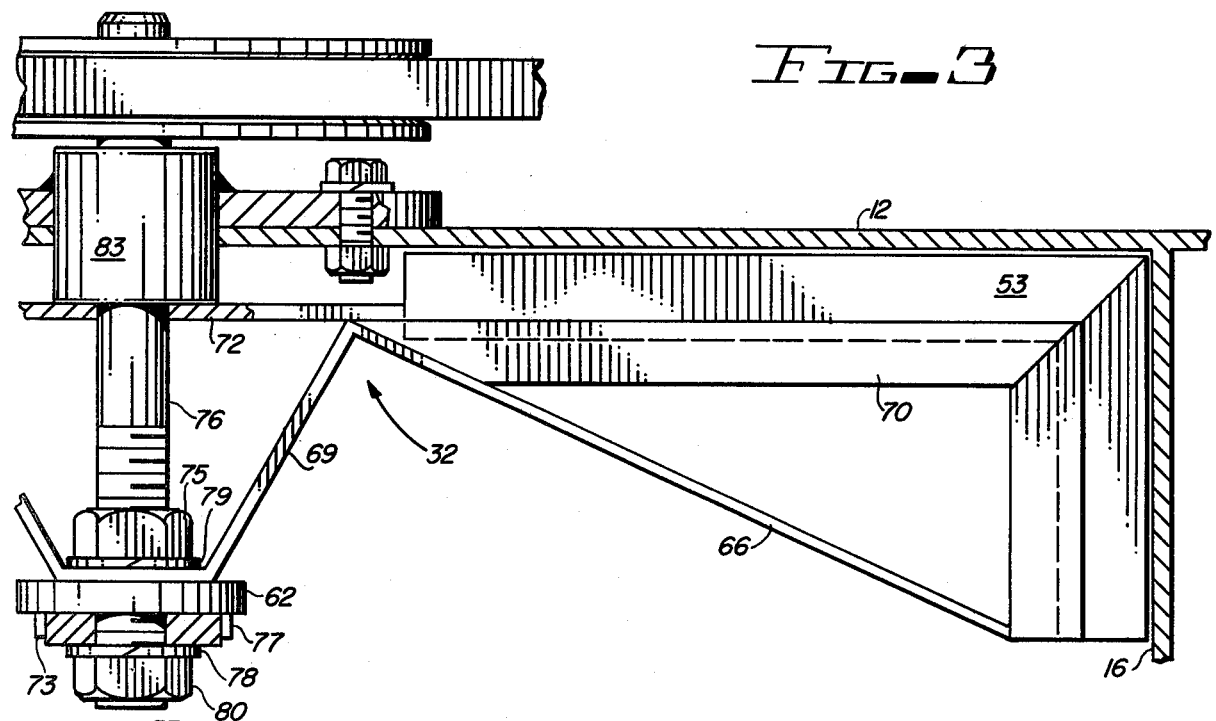
FIG. 3 is a side elevational view of half of the cleaner blade assembly used in conjunction with a single cutting blade located in one of the two individual blade housings of FIG. 1.
Figure 5:
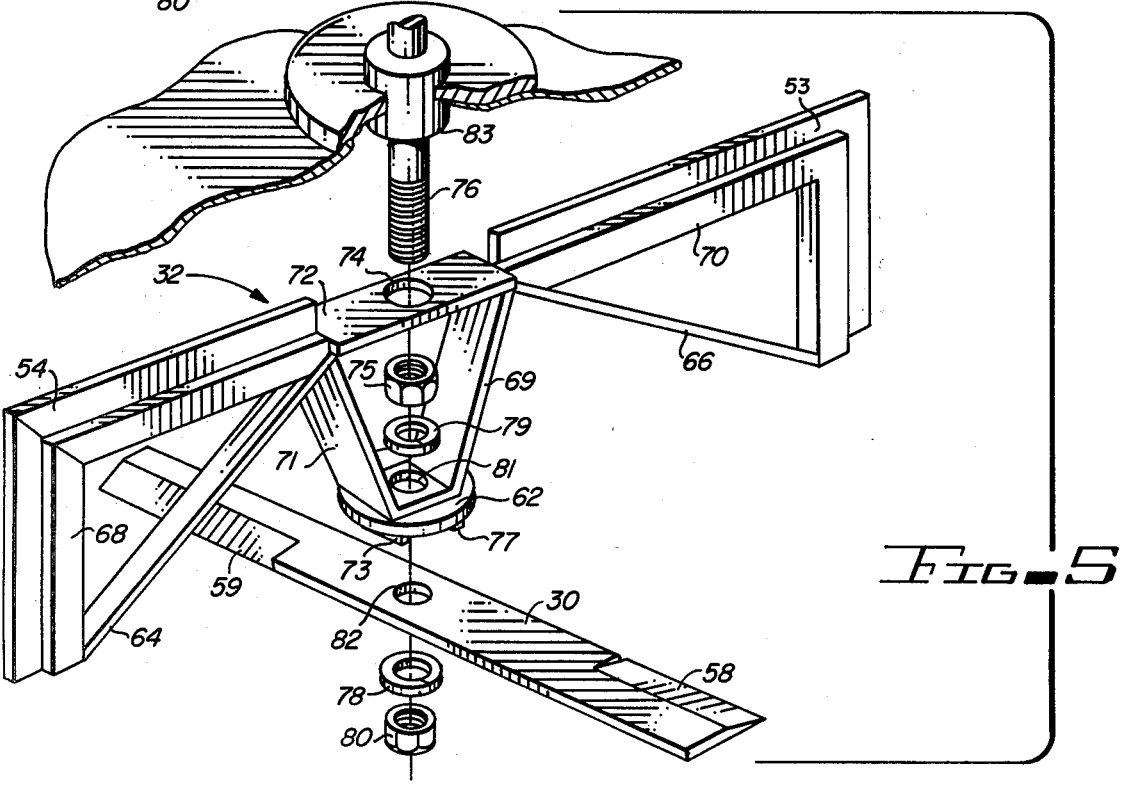
FIG. 5 is an exploded perspective view of one cleaner blade assembly and its associated cutting blade assembly which would be used together in one of the two individual blade housings of FIG. 1.

Referring to FIGS. 3, and 5, the cleaning blade assembly (only a portion of which is shown in FIG. 3) for one of the two sets of blades is referenced generally by the number 32. The cleaning blade assembly 32, is comprised of a horizontal base plate 72 and two permanently mounting cleaning blade holders 68 and 70 (see FIG. 5) connected on opposite sides to the base plate 72. Cleaning blades 53 and 54 (see FIG. 5) are preferably slide mounted, respectively, into the cleaning blade holders 70 and 68. Supporting the cleaning blade holders 68 and 70 are angled support bars 64 and 66 (see FIG. 5). Connected to the horizontal base plate 72, via two nearly slanted support bars 69 and 71 and interconnected plate, is circular mounting plate 62, to which the cutting blade 30 is mounted. Along the bottom of the circular mounting plate 62 is a path formed between two side blade support rails 73 and 77. The cutting blade 30 slides into the path between the rails 73. Cut into the horizontal base plate 72, circular mounting plate 62, and the cutting blade 30, are drive shaft holes 74, 81, and 82, respectively, of diameter so as to allow the insertion therethrough of drive shaft 76 thereby connecting the cleaning blade assembly 32 and the cutting blade 30 together at right angles to avoid interference between the separate functions of cutting and cleaning.

Figure 4:
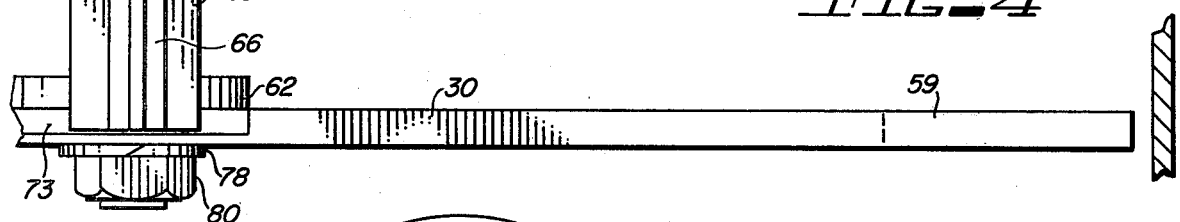
FIG. 4 is a side elevational view of a half of the cutting blade assembly used within one of the two individual blade housings of FIG. 1.

The cleaning blade assembly 32 and cutting blade 30 are preferably held firmly to the drive shaft by one of a number of conventional methods. Shown for example in FIGS. 3, 4, and 5, the drive shaft 76 is inserted through the base plate 72 of the cleaner blade assembly 32. Adjustment nut 75 is then twisted onto drive shaft 76, followed by the placement of lock washer 79. The top portion of the cleaning blade assembly is then placed flush against bearing housing 83. Adjustment nut 75 and lockwasher 79 are then lowered until base plate 72 is no longer touching bearing housing 83 and the wiper blades 53 and 54 do not touch the mower deck 12. The mower blade 30 then slides between rails 73 and 77 of the circular mounting member 62. The combined cleaner and cutting assembly is then securely fastened with lockwasher 78 and nut 80.

As the drive shaft 76 is turned via motor and pully assembly 15, both the cleaning blade assembly 32 and cutting blade 30 turn simultaneously. The leading cutting edges 58 and 59 of cutting blade 30 cut grass of varying length and dampness. The combined rotational action of the cutting blade and the rotational action of the cleaning blade act to force the grass clippings to continue in their circular path, eventually leaving the blade housing 16 through exit chute path 24 as guided by exit chute housing 20 and exit chute cover 40. In a corresponding manner, the second set of blade 26 and cleaning member 28 mounted in the second housing 14, cut and expel grass.

While the invention has been particularly shown and described with reference to preferred embodiments thereof, it will be understood by those skilled in the art that the foregoing and other changes in form and details may be made therein without departing from the scope of the invention. For example, the improved lawn mower could be powered by either a combustion or an electric engine. The lawn mower housing can be adapted to be powered by a riding lawn tractor, however, by the addition to the lawn mower housing of a four wheel assembly, a handle, a direct drive power train replacing the pulley assembly, and an engine permanently mounted on the lawn mower housing, the improved lawn mower can be manually pushed.

What is claimed is:

1. A lawn mower capable of cutting a wide path through grass, comprising:

a housing;

at least two blade housings mounted substantially diagonally opposed to each other on said housing;

a cuting blade rotatively mounted in each of the said blade housings;

separate exit shoot means coupled to each one of said to blade housings to accomodate the removal of grass clippings from each one of the said two blade housings, each of said two blade housings comprising a separate wall which follows generally the arcuate path of its respective cutting blade except for that portion of the arcuate path corresponding to the entry of its respective exit shoot, each of said separate exit shoots comprising different first and second walls leading from its respective blade housing to an outlet portion on one side of said housing;

a cleaner blade associated with and mounted at right angles to each cutting blade;

said cleaner blade comprising a frame portion having slots and a substantially rigid rubber wiper having two L-shaped sections located within said slots along the top-horizontal and side-vertical edges of said frame portion;

wherein the exterior portion of said rubber wiper is close to the interior of said blade housing.

2. A lawn mower in accordance with claim 1 wherein said housing having a substantially rectangular configuration, said exit chute means outlet portions being located on one side portion of said substantially rectangular housing.

3. A lawn mower in accordance with claim 1 in which said exit chute means have removable exit chute covers.

* * * * *